(12) United States Patent
Moon et al.

(10) Patent No.: US 11,294,418 B2
(45) Date of Patent: Apr. 5, 2022

(54) STREAM CLOCK GENERATOR AND EMBEDDED DISPLAYPORT SYSTEM INCLUDING THE SAME

(71) Applicant: Silicon Works Co., Ltd., Daejeon (KR)

(72) Inventors: Yong Hwan Moon, Daejeon (KR); Tae Ho Kim, Daejeon (KR); Jeong Ho Park, Daejeon (KR)

(73) Assignee: Silicon Works Co., Ltd, Daejeon (KR)

( * ) Notice: Subject to any disclaimer, the term of this patent is extended or adjusted under 35 U.S.C. 154(b) by 2 days.

(21) Appl. No.: 17/070,091

(22) Filed: Oct. 14, 2020

(65) Prior Publication Data

US 2021/0109561 A1 Apr. 15, 2021

(30) Foreign Application Priority Data

Oct. 15, 2019 (KR) .......................... 10-2019-0127663

(51) Int. Cl.
*G06F 1/08* (2006.01)
*G06F 1/10* (2006.01)
*G06F 1/12* (2006.01)

(52) U.S. Cl.
CPC .................. *G06F 1/08* (2013.01); *G06F 1/10* (2013.01); *G06F 1/12* (2013.01)

(58) Field of Classification Search
CPC .................. G06F 1/08; G06F 1/10; G06F 1/12
See application file for complete search history.

(56) References Cited

U.S. PATENT DOCUMENTS

| 8,611,486 | B2* | 12/2013 | Choi | G09G 5/008 |
| | | | | 375/371 |
| 2012/0093199 | A1* | 4/2012 | Liu | H04B 15/04 |
| | | | | 375/141 |
| 2013/0278591 | A1* | 10/2013 | Moon | G09G 3/3618 |
| | | | | 345/214 |
| 2015/0138212 | A1* | 5/2015 | Bae | G09G 3/2096 |
| | | | | 345/520 |

FOREIGN PATENT DOCUMENTS

| KR | 10-1315084 B1 | 10/2013 |
| KR | 2015-0055324 A | 5/2015 |
| KR | 2016-0129207 A | 11/2016 |
| KR | 2017-0038217 A | 4/2017 |
| KR | 2017-0136071 A | 12/2017 |

\* cited by examiner

*Primary Examiner* — Zahid Choudhury
(74) *Attorney, Agent, or Firm* — Polsinelli PC

(57) ABSTRACT

Provided are an apparatus capable of generating a stream clock having the same frequency as a frequency in a normal mode, in a panel self-refresh mode and an embedded DisplayPort system including the same. The embedded DisplayPort system includes a stream clock generator. The stream clock generator may include an internal oscillator configured to oscillate an internal clock, a frequency regulator configured to compare frequencies of the internal clock and a link symbol clock, generate control signals, and adjust a frequency of the internal clock using the control signals, wherein the link symbol clock is reconstructed from stream data of the embedded DisplayPort system, and a phase-locked loop configured to generate a stream clock using the internal clock and lock a phase of the stream clock to a phase of the internal clock.

20 Claims, 3 Drawing Sheets

STREAM CLOCK GENERATOR AND EMBEDDED DISPLAYPORT SYSTEM INCLUDING THE SAME

BACKGROUND

1. Technical Field

The present disclosure relates to an embedded DisplayPort system, and more particularly, to an apparatus capable of generating a stream clock having the same frequency as a stream clock in a normal mode prior to a panel self-refresh mode, and an embedded DisplayPort system including the same.

2. Related Art

An embedded DisplayPort is a display interface dependent on the transmission of packetized data having a digital communication form. The protocol of the embedded DisplayPort performs communication based on a data packet, and may have a clock signal embedded in stream data.

Video Electronics Standards Association (VESA) proposes a panel self-refresh mode in an embedded DisplayPort standard version. The panel self-refresh mode is a method of reducing power consumption of a system level.

The embedded DisplayPort performs the panel self-refresh mode when an image to be displayed has a static state during multiple display frames.

The embedded DisplayPort does not receive stream data having a clock embedded therein in the panel self-refresh mode, and displays the same image using image data stored in an internal frame buffer.

The embedded DisplayPort requires a clock generation circuit for generating a stream clock having the same frequency as a stream clock in a normal mode prior to the panel self-refresh mode because the embedded DisplayPort does not receive a clock in the panel self-refresh mode.

SUMMARY

Various embodiments are directed to the provision of an apparatus capable of generating a stream clock having the same frequency as a stream clock in a normal mode prior to a panel self-refresh mode, and an embedded DisplayPort system including the same.

In an embodiment, a stream clock generator may include an internal oscillator configured to oscillate an internal clock, a frequency regulator configured to compare frequencies of the internal clock and a link symbol clock, generate control signals, and adjust a frequency of the internal clock using the control signals, wherein the link symbol clock is reconstructed from stream data of an embedded DisplayPort system, and a phase-locked loop configured to generate a stream clock using the internal clock and lock a phase of the stream clock to a phase of the internal clock.

In an embodiment, an embedded DisplayPort system may include a source device configured to provide stream data in a normal mode and a sink device configured to reconstruct a link symbol clock from the stream data, oscillate an internal clock, compare frequencies of the internal clock and the link symbol clock, and adjust the frequency of the internal clock in the normal mode and to generate a stream clock having a constant frequency using the internal clock and display, on a display panel, image data stored in a frame buffer using the stream clock in a panel self-refresh mode.

In an embodiment, an embedded DisplayPort system may include a receiver configured to reconstruct a link symbol clock from a received stream data and a timing controller configured to control an internal clock to be oscillated, frequencies of the internal clock and the link symbol clock to be compared, the frequency of the internal clock to be adjusted, a stream clock having a constant frequency to be generated using the internal clock, and image data stored in a frame buffer to be displayed on a display panel using the stream clock.

DETAILED DESCRIPTION

Figure 1:
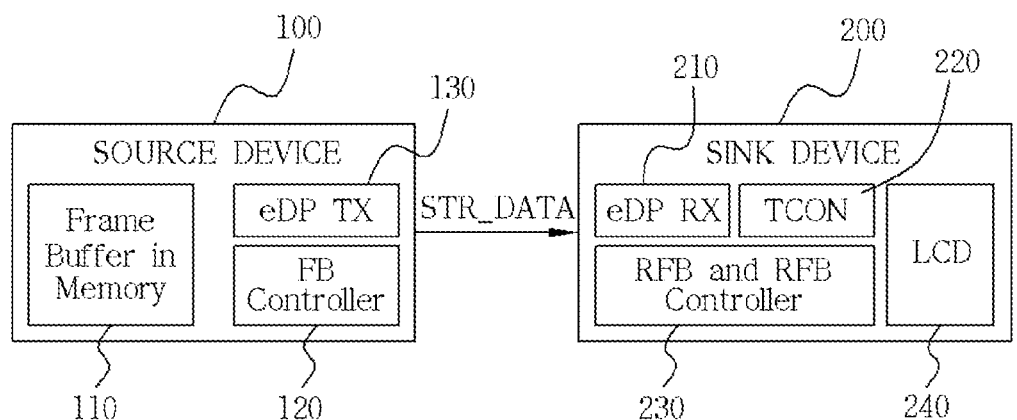
FIG. 1 is a block diagram of an embedded DisplayPort system according to an embodiment.

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Embodiments provide an apparatus capable of generating a stream clock having the same frequency as a stream clock in a normal mode prior to a panel self-refresh mode, and an embedded DisplayPort system including the same.

The normal mode may be defined as an operation of reconstructing, by a sink device, image data transmitted by a source device of the embedded DisplayPort system and displaying the image data on a display panel.

Furthermore, the panel self-refresh mode is an optional function between the source device and the sink device for reducing power consumption of the embedded DisplayPort system. The panel self-refresh mode may be defined as an operation of displaying a static image on a display panel using image data stored in a frame buffer, in the state which the source device is turned off and the sink device is not turned off when image data to be displayed is the static image.

FIG. 1 is a block diagram of an embedded DisplayPort system according to an embodiment.

Referring to FIG. 1, the DisplayPort system may include a source device 100 and a sink device 200.

The source device 100 provides stream data STR DATA to the sink device 200. In this case, the stream data STR DATA may have image data and a link symbol clock embedded therein.

The source device 100 may provide the stream data STR DATA to the sink device 200 in the normal mode. When an image to be displayed has a static state, the source device 100 may transmit an entry signal of the panel self-refresh mode to the sink device 200, and may be turned off.

The source device 100 may include a frame buffer 110, a frame buffer (FB) controller 120, and a transmitter (TX) 130.

The frame buffer 110 stores image data to be transmitted in a frame unit. The FB controller 120 controls image data in the frame buffer 110 to be stored in a frame unit and image data, stored in the frame buffer 110, to be outputted to the transmitter 130 in a frame unit. The transmitter 130 converts image data, stored in the frame buffer 110, into a signal form defined according to the protocol of an embedded display port, and transmits, to the sink device 200, the stream data STR DATA in which image data and a link symbol clock are embedded.

The sink device 200 receives the stream data STR DATA from the source device 100, reconstructs the image data and the link symbol clock from the stream data STR DATA, generates a stream clock using the link symbol clock, and displays the image data on a display panel using the stream clock.

The sink device 200 may include a receiver (RX) 210, a timing controller (TCON) 220, a remote frame buffer (RFB) and RFB controller 230, and a display panel (LCD) 240.

The receiver 210 reconstructs the image data and the link symbol clock from the stream data STR DATA transmitted by the source device 100, and provides the image data to the RFB and RFB controller 230. The RFB and RFB controller 230 stores the image data in a frame unit, and provides the image data to the timing controller 220 in a frame unit. The timing controller 220 controls an image to be displayed on the display panel 240.

More specifically, if an image to be displayed is a static image, the source device 100 may transmit, to the sink device 200, an active signal or entry signal of the panel self-refresh mode as a data packet.

The sink device 200 detects the active signal or the entry signal, and controls image data, stored in the RFB 230, to be displayed on the display panel 240 until an inactive signal of the panel self-refresh mode is received from the source device 100. In this case, the sink device 200 may generate a stream clock having the same frequency as a stream clock prior to the panel self-refresh mode, and may display, on the display panel 240, the image data stored in the RFB 230 using the stream clock.

Furthermore, the sink device 200 may track the state signal of the source device 100 in the panel self-refresh mode, in the panel self-refresh mode, and may display image data on the display panel 240 in synchronization with timing provided by the source device 100, when receiving an inactive signal of the panel self-refresh mode from the source device 100.

Figure 2:
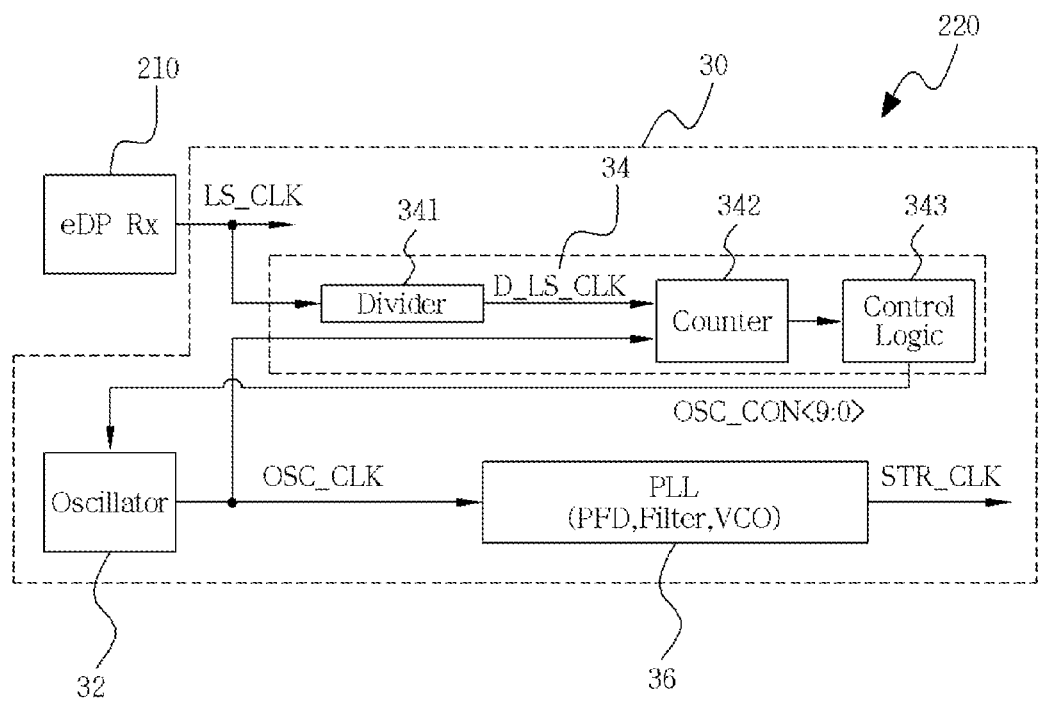
FIG. 2 is a block diagram of a stream clock generator according to an embodiment.

FIG. 2 is a block diagram of a stream clock generator 30 according to an embodiment.

Referring to FIG. 2, the stream clock generator 30 may include an internal oscillator 32, a frequency regulator 34 and a phase-locked loop (PLL) 36.

The internal oscillator 32 oscillates an internal clock OSC_CLK. The frequency of the internal clock OSC_CLK may be adjusted based on values of control signals OSC_CON<9:0>.

The frequency regulator 34 may receive the internal clock OSC_CLK and a link symbol clock LS_CLK, may compare the frequencies of the internal clock OSC_CLK and the link symbol clock LS_CLK, and may generate the control signals OSC_CON<9:0>. The link symbol clock LS_CLK may be defined as a signal reconstructed from the stream data STR DATA transmitted by the source device 100.

The frequency regulator 34 adjusts the frequency of the internal clock OSC_CLK using the control signals OSC_CON<9:0>. The frequency regulator 34 may compare the frequencies of the internal clock OSC_CLK and the link symbol clock LS_CLK, and may increase or decrease values of the control signals OSC_CON<9:0> based on a result of the comparison. For example, the frequency regulator 34 may increase values of the control signals OSC_CON<9:0> when a frequency of a division clock D_LS_CLK, divided from the internal clock OSC_CLK, is greater than a frequency of the internal clock OSC_CLK, and may decrease the values of the control signals OSC_CON<9:0> when the frequency of the division clock D_LS_CLK is smaller than the frequency of the internal clock OSC_CLK.

The frequency regulator 34 adjusts the frequency of the internal clock OSC_CLK using the control signals OSC_CON<9:0> in the normal mode, and holds values of the control signals OSC_CON<9:0> in the panel self-refresh mode.

The PLL 36 may generate a stream clock STR_CLK using the internal clock OSC_CLK, and may lock the phase of the stream clock STR_CLK to the phase of the internal clock OSC_CLK. The PLL 36 locks the phase of the stream clock STR_CLK so that the phase of the stream clock STR_CLK is not shaken, and allows the stream clock STR_CLK having a constant frequency to be output.

The PLL 36 may include a phase difference detector (PFD) (not illustrated) for comparing the phases of the internal clock OSC_CLK and the fed-back stream clock STR_CLK and detecting a phase difference, a low pass loop filter (not illustrated) for determining a high frequency component and a sync characteristic or response characteristic of the PLL, and a voltage controller (VCO) (not illustrated) for adjusting the amount of delay of a delay circuit (not illustrated) based on the phase difference and locking the phase of the stream clock STR_CLK to the phase of the internal clock OSC_CLK. A detailed description of the PLL 36 is omitted from this document.

Furthermore, the frequency regulator 34 may include a divider 341, a counter 342 and a control logic circuit 343.

The divider 341 may provide the division clock D_LS_CLK by dividing the link symbol clock LS_CLK. The counter 342 may compare the frequencies of the division clock D_LS_CLK and the internal clock OSC_CLK, and may output a count signal based on a result of the comparison. The control logic circuit 343 may increase or decrease values of the control signals OSC_CON<9:0> in response to the count signal.

For example, the control logic circuit 343 may increase values of the control signals OSC_CON<9:0> when a frequency of the division clock D_LS_CLK divided from the internal clock OSC_CLK is greater than a frequency of the internal clock OSC_CLK, and may decrease the values of the control signals OSC_CON<9:0> when the frequency of the division clock D_LS_CLK is smaller than the frequency of the internal clock OSC_CLK.

In other words, in the embedded DisplayPort system, the receiver 210 of the sink device 200 reconstructs the link symbol clock LS_CLK and the image data from the stream data STR DATA transmitted at the speed of the link symbol clock LS_CLK. In this case, the link symbol clock LS_CLK has been defined as 270 Mbps in a high bit rate (HBR) mode, and defined as 162 Mbps in a reduced bit rate (RBR) mode. In order to reduce a frequency deviation of the internal oscillator 32 between chips depending on a process, voltage, and temperature (PVT), the sink device 200 may include the frequency regulator 34 for comparing the link symbol clock LS_CLK, reconstructed using a clock data recovery (CRD) circuit of the receiver 210 and the internal clock OSC_CLK generated by the internal oscillator 32 in the normal mode (i.e., the inactive state of the panel refresh mode) and generating a constant stream clock STR_CLK by adjusting the frequency of the internal clock OSC_CLK.

The frequency regulator 34 has a turn-off state in the active state of the panel self-refresh mode, and may maintain a constant frequency because it has values of the control signals OSC_CON<9:0> in the inactive state of the panel self-refresh mode.

When the sink device 200 receives an inactive signal of the panel self-refresh mode from the source device 100, the frequency regulator 34 operates again and continuously adjusts the frequency of the internal clock OSC_CLK of the internal oscillator 32. The frequencies of the internal clock OSC_CLK are different from each other depending on characteristics of a chip, but the frequency regulator 34 compares the frequencies of the internal clock OSC_CLK and the link symbol clock LS_CLK reconstructed from the receiver 210 of the sink device 200 and generates values of new control signals OSC_CON<9:0>. The PLL generates the stream clock STR_CLK using the values of the new control signals OSC_CON<9:0>. Accordingly, although the frequencies of the internal clock OSC_CLK are different from each other between chips, the aforementioned embodiments may be applied.

In the embodiment described with reference to FIG. 2, it has been described that the timing controller 220 includes the stream clock generator 30, but the present disclosure is not limited thereto. The stream clock generator 30 may be included in the receiver 210 or may be formed separately from the receiver 210 and the timing controller 220.

Figure 3:
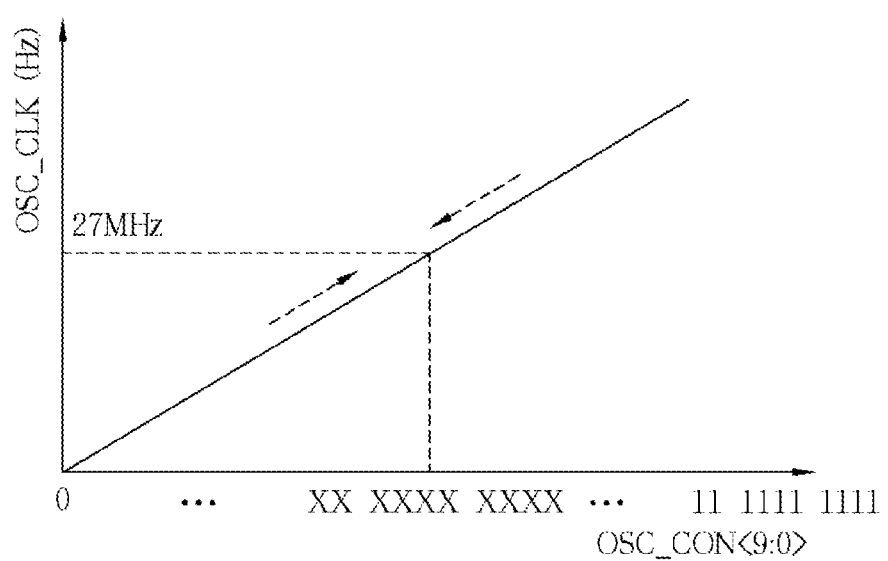
FIG. 3 is a graph illustrating an output frequency characteristic of an internal oscillator according to a value of the control signal of the internal oscillator according to an embodiment.

FIG. 3 is a graph illustrating an output frequency characteristic of the internal oscillator 32 according to a value of the control signal of the internal oscillator 32 according to an embodiment.

Referring to FIG. 3, frequency characteristics of the internal clock OSC_CLK of the internal oscillator 32 according to values of the control signals OSC_CON<9:0> show different linear characteristics. Although the frequencies of the oscillators between chips are different, the internal oscillator 32 may output the internal clock OSC_CLK having a desired frequency by changing values of the control signals OSC_CON<9:0>.

For example, an operation of adjusting the frequency of the internal oscillator 32 in the HBR mode is described below. For example, the internal clock OSC_CLK having a frequency of 27 MHz may be counted based on the division clock D_LS_CLK having a frequency of 30 kHz obtained by dividing by 4500 from the link symbol clock LS_CLK having a frequency of 135 MHz. The frequency of the internal clock OSC_CLK may be adjusted to correspond to the frequency of the link symbol clock LS_CLK by increasing or decreasing values of the control signals OSC_CON<9:0> until a counted value falls within a given range (899<Count value<901). The control signals OSC_CON<9:0> are updated with a counted result whenever the count signal of "1" is generated. In this case, an interval between the count signals may be 33.33 us, that is, one cycle of the division clock D_LS_CLK. For example, when the frequency of the internal oscillator 32 is initially higher than 27 MHz, values of the control signals OSC_CON<9:0> may be decreased to hex (200->1ff->1fd-> . . . ->1f5). When the frequency of the internal oscillator 32 is initially lower than 27 MHz, values of the control signals OSC_CON<9:0> may be increased to hex (200->201->202-> . . . ->20 C). Furthermore, a bit interval in which the values of the control signals OSC_CON<9:0> are increased or decreased may be set to be optionally adjusted.

Figure 4:
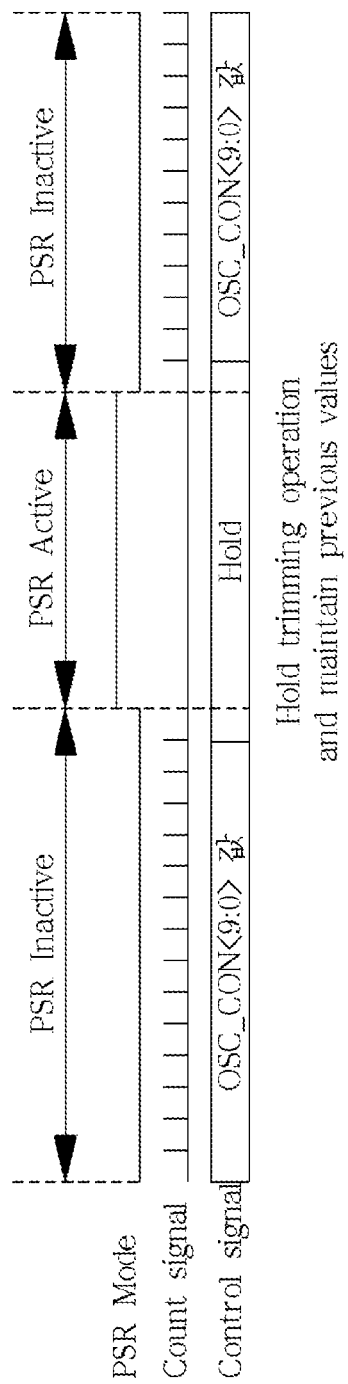
FIG. 4 is a timing diagram for describing an operation of the internal oscillator when the internal oscillator enters a panel self-refresh mode according to an embodiment.

FIG. 4 is a timing diagram for describing an operation of the internal oscillator 32 when the internal oscillator 32 enters the panel self-refresh mode according to an embodiment.

Referring to FIG. 4, PSR Mode="0" indicates the normal mode (i.e., panel self-refresh mode off), and PSR Mode="1" indicates the entry into the self-refresh mode. When the PSR mode signal is "0", the frequency regulator 34 continues to update values of the control signals OSC_CON<9:0> based on a count signal. When the PSR mode signal is "1", the frequency regulator 34 holds the values of the control signals OSC_CON<9:0> in the PSR Mode "0." Accordingly, the internal oscillator 32 outputs the same frequency as a frequency in the normal mode prior to the panel self-refresh mode.

As described above, according to embodiments, in the panel self-refresh mode, the stream clock STR_CLK having the same frequency as a frequency in the normal mode can be generated.

Furthermore, according to embodiments, the frequencies of the internal clock OSC_CLK and the link symbol clock LS_CLK are compared, and the frequency of the internal clock OSC_CLK is adjusted. Accordingly, although the source device 100 is turned off in the panel self-refresh mode, the same stream clock STR_CLK as a stream clock in the normal mode prior to the panel self-refresh mode can be generated and maintained.

Furthermore, according to embodiments, although output frequencies are different from each other due to an oscillator characteristic between chips, external power, or a chip temperature during operation, the stream clock STR_CLK having a constant frequency can be generated.

While various embodiments have been described above, it will be understood to those skilled in the art that the embodiments described are by way of example only. Accordingly, the disclosure described herein should not be limited based on the described embodiments.

What is claimed is:

1. A stream clock generator comprising:
   an internal oscillator configured to oscillate an internal clock;
   a frequency regulator configured to compare frequencies of the internal clock and a link symbol clock, generate control signals, and adjust a frequency of the internal clock using the control signals, wherein the link symbol clock is reconstructed from stream data of an embedded DisplayPort system; and
   a phase-locked loop configured to generate a stream clock using the internal clock and lock a phase of the stream clock to a phase of the internal clock.

2. The stream clock generator of claim 1, further comprising a receiver configured to receive the stream data from a source device of the embedded DisplayPort system and reconstruct the link symbol clock from the stream data.

3. The stream clock generator of claim 1, wherein the frequency regulator is configured to:
   compare the frequencies of the internal clock and the link symbol clock, and
   increase or decrease values of the control signals based on a result of the comparison.

4. The stream clock generator of claim 3, wherein the frequency regulator is configured to perform a trimming operation of increasing or decreasing the values of the control signals in a normal mode.

5. The stream clock generator of claim 4, wherein the frequency regulator is configured to hold the values of the control signals in a panel self-refresh mode.

6. The stream clock generator of claim 1, wherein the frequency regulator comprises:
    a divider configured to provide a division clock by dividing the link symbol clock;
    a counter configured to compare a frequency of the division clock and the frequency of the internal clock and output a count signal based on a result of the comparison; and
    a control logic circuit configured to increase or decrease values of the control signals in response to the count signal.

7. The stream clock generator of claim 6, wherein the control logic circuit is configured to increase the values of the control signals when the frequency of the division clock is greater than the frequency of the internal clock.

8. The stream clock generator of claim 7, wherein the control logic circuit is configured to decrease the values of the control signals when the frequency of the division clock is smaller than the frequency of the internal clock.

9. An embedded DisplayPort system comprising:
    a source device configured to provide stream data in a normal mode; and
    a sink device configured to reconstruct a link symbol clock from the stream data, oscillate an internal clock, compare frequencies of the internal clock and the link symbol clock, and adjust the frequency of the internal clock in the normal mode and to generate a stream clock having a constant frequency using the internal clock and display, on a display panel, image data stored in a frame buffer using the stream clock in a panel self-refresh mode.

10. The embedded DisplayPort system of claim 9, wherein the sink device comprises:
    a receiver configured to reconstruct the link symbol clock from the stream data; and
    a stream clock generator configured to adjust the frequency of the internal clock in the normal mode and generate the stream clock having a constant frequency using the internal clock in the panel self-refresh mode.

11. The embedded DisplayPort system of claim 10, wherein the stream clock generator comprises:
    an internal oscillator configured to oscillate the internal clock;
    a frequency regulator configured to compare the frequencies of the internal clock and the link symbol clock, generate control signals, and adjust the frequency of the internal clock using the control signals; and
    a phase-locked loop configured to generate a stream clock using the internal clock and lock a phase of the stream clock to a phase of the internal clock.

12. The embedded DisplayPort system of claim 11, wherein the frequency regulator is configured to:
    compare the frequencies of the internal clock and the link symbol clock in the normal mode,
    increase or decrease values of the control signals based on a result of the comparison, and
    hold the values of the control signals in the panel self-refresh mode.

13. The embedded DisplayPort system of claim 11, wherein the frequency regulator comprises:
    a divider configured to provide a division clock by dividing the link symbol clock;
    a counter configured to compare a frequency of the division clock and the frequency of the internal clock, and output a count signal based on a result of the comparison; and
    a control logic circuit configured to increase or decrease values of the control signals in response to the count signal.

14. The embedded DisplayPort system of claim 10, wherein the stream clock generator is included in a timing controller.

15. The embedded DisplayPort system of claim 9, wherein the source device is configured to transmit an entry signal of the panel self-refresh mode to the sink device and be turned off, when an image to be displayed has a static state.

16. An embedded DisplayPort system comprising:
    a receiver configured to reconstruct a link symbol clock from a received stream data; and
    a timing controller configured to control an internal clock to be oscillated, frequencies of the internal clock and the link symbol clock to be compared, the frequency of the internal clock to be adjusted, a stream clock having a constant frequency to be generated using the internal clock, and image data stored in a frame buffer to be displayed on a display panel using the stream clock.

17. The embedded DisplayPort system of claim 16, wherein:
    the timing controller comprises a stream clock generator configured to generate the stream clock, and
    the stream clock generator comprises:
    an internal oscillator configured to oscillate the internal clock;
    a frequency regulator configured to compare the frequencies of the internal clock and the link symbol clock, generate control signals, and adjust the frequency of the internal clock using the control signals; and
    a phase-locked loop configured to generate the stream clock using the internal clock and lock a phase of the stream clock to a phase of the internal clock.

18. The embedded DisplayPort system of claim 17, wherein the frequency regulator is configured to:
    compare frequencies of the internal clock and the link symbol clock in a normal mode, and
    increase or decrease values of the control signals based on a result of the comparison.

19. The embedded DisplayPort system of claim 18, wherein the frequency regulator is configured to hold the values of the control signals in a panel self-refresh mode.

20. The embedded DisplayPort system of claim 17, wherein the frequency regulator comprises:
    a divider configured to provide a division clock by dividing the link symbol clock;
    a counter configured to compare a frequency of the division clock and the frequency of the internal clock and output a count signal based on a result of the comparison; and
    a control logic circuit configured to increase or decrease values of the control signals in response to the count signal.

* * * * *